United States Patent [19]

Pielartzik et al.

[11] Patent Number: 5,030,703
[45] Date of Patent: Jul. 9, 1991

[54] LIQUID CRYSTAL POLYCONDENSATES WITH IMPROVED HEAT STABILITY, A PROCESS FOR THEIR PREPARATION AND THEIR USE FOR THE PRODUCTION OF SHAPED ARTICLES, FILMS, FIBRES AND FILAMENTS

[75] Inventors: Harald Pielartzik; Rolf-Volker Meyer; Wolfgang Alewelt, all of Krefeld, Fed. Rep. of Germany

[73] Assignee: Bayer Aktiengesellschaft, Leverkusen, Fed. Rep. of Germany

[21] Appl. No.: 402,872

[22] Filed: Sep. 5, 1989

[30] Foreign Application Priority Data

Sep. 13, 1988 [DE] Fed. Rep. of Germany ....... 3831122

[51] Int. Cl.$^5$ .................. C08G 63/02; C08G 63/18
[52] U.S. Cl. .................. 528/176; 528/179; 528/183; 528/184; 528/191; 528/192; 528/193
[58] Field of Search .............. 528/176, 179, 183, 191, 528/193

[56] References Cited

U.S. PATENT DOCUMENTS

| | | | |
|---|---|---|---|
| 4,333,907 | 6/1982 | Urasaki et al. | 528/193 |
| 4,395,536 | 7/1983 | Charbonneau | 528/206 |
| 4,536,561 | 8/1985 | Schmidt et al. | 528/191 |
| 4,600,764 | 7/1986 | Dicke et al. | 528/128 |
| 4,603,190 | 7/1986 | Dicke et al. | 528/193 |
| 4,614,789 | 9/1986 | Dicke et al. | 528/128 |
| 4,742,149 | 5/1988 | Finestone | 528/179 |
| 4,835,243 | 5/1989 | Eckhardt et al. | 528/176 |
| 4,841,014 | 6/1989 | Brodowski | 528/191 |

*Primary Examiner*—Harold D. Anderson
*Assistant Examiner*—T. Mosley
*Attorney, Agent, or Firm*—Connolly and Hutz

[57] ABSTRACT

The liquid crystal polycondensates according to the invention based on aromatic hydroxycarboxylic acids, if appropriate aromatic aminocarboxylic acids, diphenols, if appropriate aminophenols, aromatic dicarboxylic acids and if appropriate carbonic acid which are obtainable by polycondensation of the difunctional monomers mentioned in the melt in the presence of aromatic esters with a defined sequence of the structural units of the formula

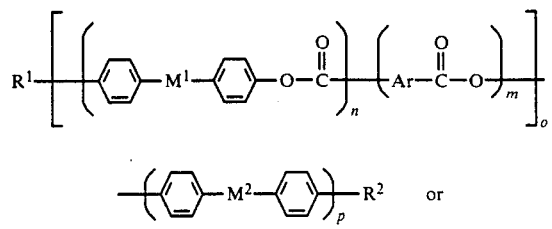

of oligomers with random distribution of the structural units of the formula

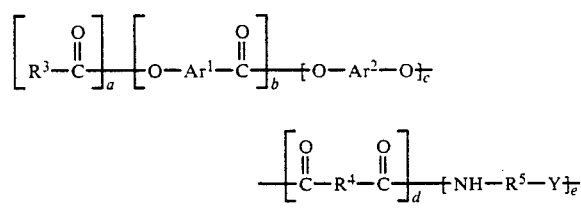

have a good heat stability and exhibit a stable viscosity under the processing conditions. The liquid crystal polycondensates can be used for the production of shaped articles, films, fibers and filaments.

4 Claims, No Drawings

LIQUID CRYSTAL POLYCONDENSATES WITH IMPROVED HEAT STABILITY, A PROCESS FOR THEIR PREPARATION AND THEIR USE FOR THE PRODUCTION OF SHAPED ARTICLES, FILMS, FIBRES AND FILAMENTS

The invention relates to liquid crystal polycondensates with improved heat stability, a process for the preparation of the polycondensates and their use for the production of shaped articles, films, fibres and filaments.

Thermotropic or liquid crystal polycondensates of aromatic hydroxycarboxylic acids, aromatic dicarboxylic acids, aromatic dihydroxy compounds and if appropriate carbonic acid, and also if appropriate other aromatic difunctional compounds have been known for a long time (c.f. e.g. the literature summary in DE-OS 33 38 623, Recent Advances in Liquid Crystalline Polymers, Elsevier, Appl. Sci. Publishers, 1985 (L. Chapoy) or British Polymer Journal, vol.12, no. 4, pages 132–146 (1980) (J.-I. Jin et al.)).

Shaped articles produced from liquid crystal polycondensates have, above all, particular mechanical properties, such as high strength and rigidity coupled with a good level of toughness, and a good heat stability, so that they are suitable for the most diverse intended industrial uses in which good mechanical properties and a high heat stability play a role. In general, however, the liquid crystal (LC) polycondensates have a high melt viscosity, which causes technical problems during processing of the polycondensates to shaped articles. Moulding compositions of LC polymers require, for example, a higher processing temperature. As a result of the higher processing temperature, however, thermal degradation of the LC polymers used can easily occur, which means that, for example, the mechanical properties of the shaped articles are impaired. This applies in particular to polymers in which reactive end groups are not protected by so-called end masking reagents (chain stoppers). An essential factor of the heat stability of such polymers is therefore appropriate blocking of the reactive end groups by so-called end masking agents, so that chain cleavage, undesirable rearrangements or a build-up of molecular weight, which interferes with the processing with volatile by-products being split off, can be avoided in the polymers. It is known, for example, that the aromatic hydroxycarboxylic acids incorporated into the LC polymers readily decarboxylate (see D. Sitamanikyam and E. V. Sundaram, Indian J. Chem., 1972, 1011–1013).

The use of the known and customary end masking agents, such as phenols, amines or carboxylic acids, is associated with major problems because of the high reaction temperatures during the melt transesterification and the volatility of the end masking agents and leads to results which are difficult to reproduce (in this context see the comparison examples). For this reason, EP 162 667 describes controlling the build-up of the chain via the molar ratio of carboxyl to phenolic OH groups. However, these products contain reactive chain ends and are therefore not sufficiently heat-stable.

EP 161 413 describes phthalimides of low volatility and containing carboxyl or phenol groups as end masking agents or chain stoppers for liquid crystal polyesters. An advantage which is singled out is that the polyesters are still accessible for subsequent solid phase condensation. Such polyesters thus change their molecular weight when exposed to heat. They therefore do not have a stable viscosity and can change their flow properties in an uncontrolled and hence adverse manner under processing conditions.

The invention relates to liquid crystal polycondensates based on
a) aromatic hydroxycarboxylic acids
b) if appropriate aromatic aminocarboxylic acids
c) diphenols
d) if appropriate aminophenols
e) aromatic dicarboxylic acids and
f) if appropriate carbonic acid obtainable by melt transesterification of $C_1$- to $C_4$-acyl esters derived from the hydroxycarboxylic acids, diphenols and aminophenols, preferably the acetates, with the dicarboxylic acids or by melt transesterification of the phenyl esters of the hydroxycarboxylic acids, if appropriate aminocarboxylic acids, dicarboxylic acids and carbonic acid with the diphenols and if appropriate aminophenols at 150° to 380° C. in the presence of aromatic esters of the formula (I) with a defined sequence of the structural units

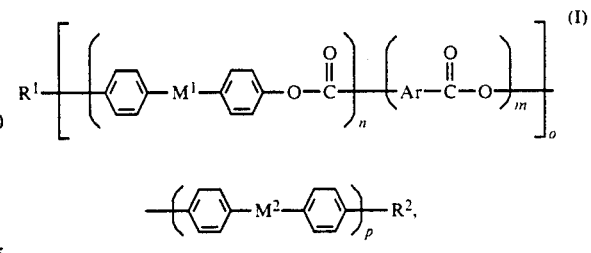

wherein
Ar is an aromatic radical which can be mononuclear or polynuclear, it being possible for the poly nuclear radical to be linked via a single bond or fused, $R^1$ and $R^2$ can be identical or different and are H, chlorine, $O$—$C_1$-$C_4$-alkyl, —$O$—$C_3$-$C_6$-cycloalkyl, $O$—$C_6$-$C_{14}$-aryl, $C_1$-$C_4$-alkyl, $C_3$-$C_6$-cycloalkyl, $C_6$-$C_{14}$-aryl, fluorinated $C_1$-$C_4$-alkyl, fluorinated $C_3$-$C_6$-cycloalkyl, fluorinated $C_6$-$C_{14}$-aryl or a radical of the formulae (I)/a) to L):

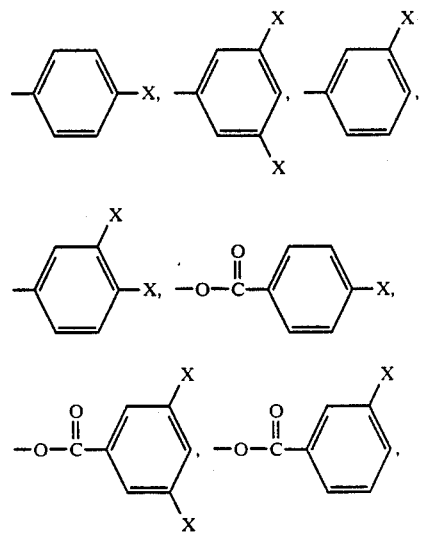

-continued

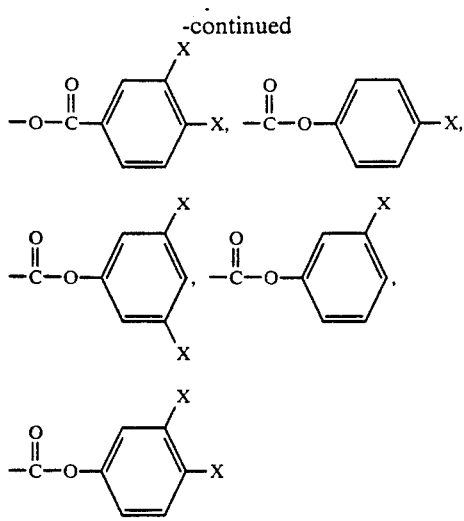

(radicals (I/a)–(I/l) corresponding to their linear (left→right) sequence),
wherein
X represents the radicals mentioned above for $R^1$ or $R^2$ from H to fluorinated $C_6$–$C_{14}$-aryl, $M^1$ and $M^2$ are identical or different and can be divalent radicals of the formulae (I.1) to (I.11):

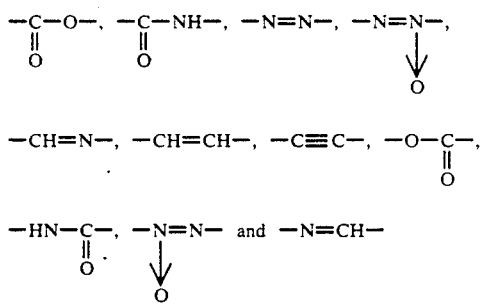

(I.1)–(I.11) [corresponding to their sequence]

and wherein
m is zero, 1 or 2,
n is 1 or 2,
o is 1, 2 or 3 and
p is zero or 1, and wherein, in the case where p=zero, $R^2$ can only be (Ia), (Ib), (Ic) or (Id),
or of oligomers of the formula (II) with random distribution of the structural units

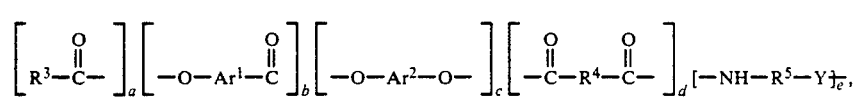

wherein
$R^3$ represents an alkyl or an optionally substituted aryl radical, $Ar^1$ is a bivalent, optionally substituted mono- or polynuclear aromatic radical, it being possible for the polynuclear radical to be linked via a single bond or fused, $Ar^2$ represents a bivalent, optionally substituted mono- or polynuclear aromatic radical, it being possible for the polynuclear radical to be linked in various ways, $R^4$ and $R^5$ represent $C_mH_{2m}$, where m=0 to 50, or have the meaning of an optionally substituted bivalent mono- or polynuclear aromatic radical, it being possible for the polynuclear radical to be linked in various ways, Y represents —O—, —CO— or —NH—, and in the case of linkage with an end group denotes —O— or —NH—,
a=2,
b=zero to 5,
c=1 to 5,
d=zero to 4 and
e=zero to 3,
and wherein the end groups are formed by structural elements of the type $R^3CO$.

Compounds of the formula (I)

Preferred radicals —Ar— of the formula (I) are the radicals (Ar1) to (Ar4)

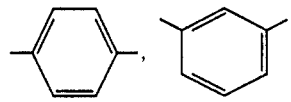
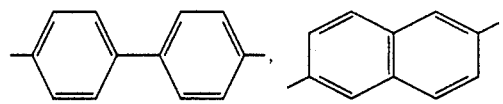

(Ar1)–(Ar4), corresponding to their sequence.

Preferred radicals $R^1$ and $R^2$ are H, $CH_3$, $OCH_3$, cyclohexyl, phenyl, $CF_3$, $OCF_3$, fluorinated cyclohexyl and fluorinated phenyl.

Preferred radicals —M— are those of the formulae (I.1), (I.2), (I.5), (I.8), (I.9) and (I.11).

Preferred index combinations m, n, o, p and q are
m=zero, n=1, o=1, p=zero;
m=zero, n=1, o=1, p=1;
m=zero, n=2, o=1, p=1;
m=n=o=p=1;
m=1, n=1, o=2, p=1;
m=zero, n=2, o=1, p=zero;
m=1, n=2, o=1, p=1 and
m=1, n=1, o=3, p=1.

The compounds of the formula (I) are distinguished in that on melting they pass through a liquid crystal phase (with regard to liquid crystal compounds and phases, see, for example: D. Demus, L. Richter, Textures of Liquid Crystals, Verlag Chemie, Weinheim—New York 1978 or H. Kelker, R. Hatz, Handbook of Liquid Crystals, Verlag Chemie, Weinheim, Deerfield 1080).

Preferred compounds of the formula (I) are those which contain 3 to 15 aromatic part structures, the radical —Ar— being selected as a part structure, regardless of whether it is mononuclear or polynuclear. Particularly preferred compounds of the formula (I) are those which contain 3 to 11 aromatic part structures, the radical —Ar— again being selected as an aromatic part structure, regardless of whether it is mononuclear or polynuclear. Especially preferred compounds of the formula (I) are those which have 3 to 7 aromatic part structures in the sense defined above.

The following four groups of compounds (I,A) to (I,D) may be mentioned as examples of compounds of the formula (I):

(I,A) Liquid crystal compounds of the formula (I) with three aromatic part structures, wherein
m=zero, n=1, o=1 and p=zero:

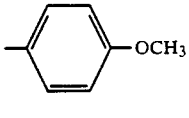

(formula IA)

| No | $R^1$ | $M^1$ | $R^2$ |
|----|-------|-------|-------|
| 1 | $CH_3$ | $-\overset{O}{\underset{\|}{C}}-O-$ | 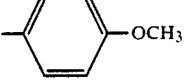—$OCH_3$ |
| 2 | $CH_3O-$ | $-O-\overset{O}{\underset{\|}{C}}-$ | 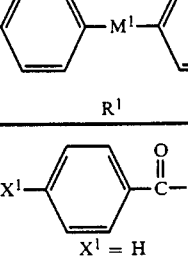—$OCH_3$ |
| 3 | $CH_3O-$ | $-O-\overset{O}{\underset{\|}{C}}-$ | 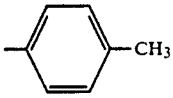—$CH_3$ |
| 4 | $CH_3$ | $-O-\overset{O}{\underset{\|}{C}}-$ | 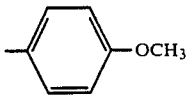—$OCH_3$ |

(I,B) Liquid crystal compounds of the formula (I) with four aromatic part structures, wherein again
m=zero, n=1, o=1 and p=zero:

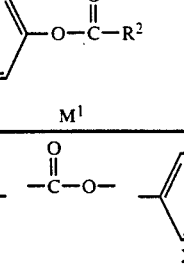

(formula IB)

| No | $R^1$ | $M^1$ | $R^2$ |
|----|-------|-------|-------|
| 5 | $X^1$—⌬—$\overset{O}{\underset{\|}{C}}-O-$ $X^1 = H$ | $-\overset{O}{\underset{\|}{C}}-O-$ | —⌬—$X^2$ $X^2 = H$ |
| 6 | $CH_3$ | | $CH_3$ |
| 7 | $OCH_3$ | | $OCH_3$ |
| 8 | $CF_3$ | | $CF_3$ |
| 9 | $Cl$ | | $Cl$ |

(I,C) Liquid crystal compounds of the formula (I) with five aromatic part structures, wherein
m=n=o=p=1.

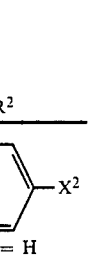

(formula IC)

| No | $R^1$ | $M^1$ | $M^2$ | $R^2$ | Ar |
|----|-------|-------|-------|-------|-----|
| 10 | H | $-O-\overset{O}{\underset{\|}{C}}-$ | $-\overset{O}{\underset{\|}{C}}-O-$ | H | ⌬ |
| 11 | $CH_3$ | " | " | $CH_3$ | " |
| 12 | $OCH_3$ | " | " | $OCH_3$ | " |
| 13 | H | $-\overset{O}{\underset{\|}{C}}-O-$ | $-O-\overset{O}{\underset{\|}{C}}-$ | H | " |
| 14 | $CH_3$ | " | " | $CH_3$ | " |
| 15 | $OCH_3$ | " | " | $OCH_3$ | " |

(I,D) Liquid crystal compounds of the formula (I) with seven aromatic part structures, wherein again
m=n=o=p=1:

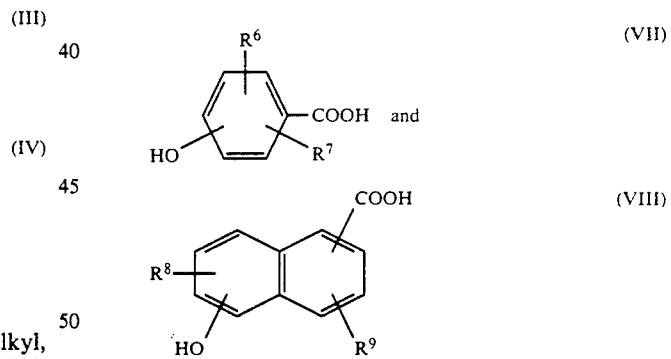

(formula ID)

Compounds of the formula (II)

Preferred radicals $R^3$ of the formula (II) are alkyl radicals with 1 to 30, particularly preferably 1 to 22, carbon atoms, such as $CH_3$, $C_2H_5$, $C_3H_7$, $C_4H_9$, $C_5H_{11}$, $C_6H_{13}$, $C_{15}H_{31}$, $C_{16}H_{33}$, $C_{17}H_{35}$, $C_{18}H_{37}$, $C_{19}H_{39}$ and $C_{22}H_{45}$, preferably $CH_3$, or aromatic radicals of the formulae (III) and (IV)

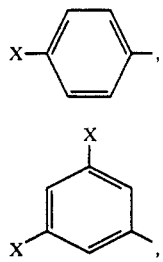

(III)

(IV)

wherein

X can be hydrogen, halogen, $NO_2$, $C_1$-$C_4$-alkyl, $C_3$-$C_6$-cycloalkyl, $C_6$-$C_{14}$-aryl, $O$—$C_1$-$C_4$-alkyl, $O$—$C_3$-$C_6$-cycloalkyl, fluorinated $C_1$-$C_4$-alkyl, fluorinated $C_3$-$C_6$-cycloalkyl or fluorinated $C_6$-$C_{14}$-aryl.

Aromatic radicals of the formulae (V) and (VI) e.g. are mentioned as being particularly preferred:

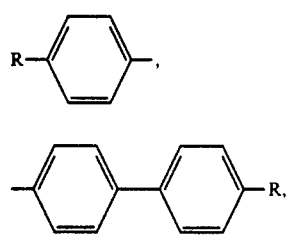

wherein

R represents hydrogen, halogen, such as fluorine or chlorine, $C_1$-$C_4$alkyl, $C_3$-$C_6$-cycloalkyl, $O$—$C_1$-$C_4$-alkyl, $O$—$C_3$-$C_6$-cycloalkyl, fluorinated $C_1$-$C_4$-alkyl or fluorinated $C_3$-$C_6$-cycloalkyl.

Those aromatic radicals of the formulae (V) and (VI) in which R denotes hydrogen are especially preferred.

Possible bivalent aromatic radicals ($Ar^1$) of the formula (II) are, in particular, those which are based on the aromatic hydroxycarboxylic acids of the formulae (VII)

(VIII)

wherein $R^6$ to $R^9$ denote $C_1$-$C_4$-alkyl (preferably methyl or ethyl), $C_1$-$C_4$-alkoxy (preferably methoxy or ethoxy), $C_6$-$C_{10}$-aryl or -aryloxy (preferably phenyl, phenyloxy, naphthyl, naphthyloxy, biphenyl, biphenyloxy, tolyl or tolyloxy), $C_7$-$C_{12}$-alkylaryl (preferably benzyl), halogen (preferably chlorine and bromine) or hydrogen and the valencies between the nucleus and hydroxyl groups and between the nucleus and carboxyl groups form an angle of 45° to 180°.

Preferred aromatic hydroxycarboxylic acids are 4-hydroxy-3-methylbenzoic acid, 4-hydroxy-3-phenyl-benzoic acid, 4-hydroxy-2-ethylbenzoic acid, 3-chloro-4-hydroxy-benzoic acid, 4-hydroxy-3-methoxybenzoic acid, 4-hydroxybenzoic acid, 3-hydroxybenzoic acid and 6-hydroxy-2-naphthoic acid. 4-Hydroxybenzoic acid, 3-hydroxybenzoic acid and 6-hydroxy-2-naphthoic acid are particularly preferred.

Possible bivalent aromatic radicals (Ar²) of the formula (II) are, in particular, those which are based on the diphenols of the formula (IX)

HO—Z—OH (IX)

wherein

Z denotes a divalent mono- or polynuclear aromatic radical with 6 to 30C atoms, Z being built up such that the two OH groups are bonded directly to in each case a C atom of an aromatic system and the two valencies form an angle of 45° to 180°.

The aromatic radicals can be substituted by 1 to 4 $C_1$–$C_4$-alkyl, $C_1$–$C_4$-alkoxy, phenyl, phenoxy, benzyl or halogen radicals (preferably chlorine and bromine) and also include, in addition to phenylene, naphthylene and biphenylene, phenylene radicals bonded via oxygen, sulphur, carbonyl, sulphonyl or azomethine, $C_1$–$C_4$-alkylene or -alkylidene, cyclohexylene or -hexylidene or —O(CH$_2$)$_n$O—, where n=2 to 4.

Preferred diphenols are e.g. hydroquinone, 4,4'-dihydroxydiphenyl, 4,4'-dihydroxydiphenyl ether, 4,4'-dihydroxydiphenylethane, 4,4'-dihydroxydiphenoxyethane, 3,5'-dihydroxydiphenyl, 3,5'-dihydroxydiphenyl ether, 1,5-dihydroxynaphthalene, 2,6-dihydroxynaphthalene, 1,4-dihydroxynaphthalene, chlorohydroquinone, bromohydroquinone, methylhydroquinone, phenylhydroquinone, ethylhydroquinone, 2,2'-dimethyl-4,4'-dihydroxydiphenyl, 3,3',5,5'-tetramethyl-4,4'-dihydroxydiphenyl, 3,5'-dimethoxy-4,4'-dihydroxydiphenyl ether, 1,2-(2-chloro-4-hydroxyphenoxy)-ethane, 4-methoxy-2,6-dihydroxynaphthalene, resorcinol, 3,4'-dihydroxydiphenyl, 3,4'-dihydroxydiphenyl ether, 3,4'-dihydroxydiphenoxyethane, 1,3-dihydroxynaphthalene, 1,6-dihydroxynaphthalene, 1,7-dihydroxynaphthalene, 2,7-dihydroxynaphthalene, 4-chlororesorcinol, 4-bromoresorcinol, 4-methylresorcinol, 4-phenylresorcinol, 4-ethoxyresorcinol, 2,5-dichloro-1,6-dihydroxynaphthalene and 4-methoxy-2,7-dihydroxynaphthalene.

Particularly preferred diphenols are hydroquinone and 4,4'-dihydroxydiphenyl.

Possible bivalent radicals (R⁴) of the formula (II) are those which are based on the dicarboxylic acids of the formula (X)

HOOC—R⁴—COOH (X)

wherein

R⁴ represents $C_nH_{2n}$, where n=0 to 50, preferably 2 to 12, or preferably
denotes a bivalent aromatic radical with 6 to 24C atoms, preferably with 6 to 16C atoms, the two valencies forming an angle of 45° to 180°. The bivalent aromatic radicals can be substituted by 1 to 4 $C_1$–$C_4$-alkyl, $C_1$–$C_4$-alkoxy, phenyl, phenoxy, benzyl or halogen radicals (preferably chlorine and bromine), and also include, in addition to phenylene, naphthylene and biphenylene, phenylene radicals bonded via oxygen, sulphur, carbonyl, sulphonyl, $C_1$–$C_4$-alkylene or -alkylidene, cyclohexylene or -hexylidene or —O(CH$_2$)$_n$O—, where n=1 to 4.

The following aliphatic dicarboxylic acids are preferred: oxalic acid, malonic acid, succinic acid, glutaric acid, adipic acid, suberic acid, azelaic acid, diethylmalonic acid, trimethyladipic acid, sebacic acid or dodecanoic acid and dimeric fatty acid (of the Pripol ® type, Unichema Company).

Preferred aromatic dicarboxylic acids are those which are based on the following bivalent radicals: 1,4-phenylene, 1,4-naphthylene or 4,4'-biphenylene, wherein the two bonds extend coaxially in opposite directions, or 1,5-naphthylene, 2,6-naphthylene or 3,5'-biphenylene, wherein the two bonds pointing in opposite directions are shifted parallel to one another, and 1,3-phenylene, 1,3-, 1,6-, 1,7- or 2,7-naphthylene or 3,4'-biphenylene, wherein the two bonds are not located on adjacent atoms and do not extend in opposite directions coaxially or with a parallel shift.

Preferred aromatic dicarboxylic acids which are mentioned are: 1,4-naphthalenedicarboxylic acid, 1,5-naphthalenedicarboxylic acid, 2,6-naphthalenedicarboxylic acid, biphenyl-4,4'-dicarboxylic acid, biphenyl-3,3'-dicarboxylic acid, diphenoxyethane-4,4'-dicarboxylic acid, diphenyl ether-4,4'-dicarboxylic acid, methylterephthalic acid, methoxyterephthalic acid, chloroterephthalic acid, 4-chloronaphthalene-2,7-dicarboxylic acid, 1,3-naphthalenedicarboxylic acid, 1,6-naphthalenedicarboxylic acid, 1,7-naphthalenedicarboxylic acid, 2,7-naphthalenedicarboxylic acid, biphenyl-3,4'-dicarboxylic acid diphenyl ether-3,4'-dicarboxylic acid, 4-methylisophthalic acid, 5-methylisophthalic acid, diphenyl ether-4,4'-dichloro-3,3'-dicarboxylic acid and iso- and terephthalic acid.

It is possible to use either exclusively aliphatic or aromatic dicarboxylic acids or mixtures of the two.

Possible bivalent radicals (R⁵) of the formula (II) are those which are based on the amino compounds of the formula (XI)

H₂N—R⁵—Y (XI)

wherein

R⁵ represents $C_mH_{2m}$, where m=0 to 20, preferably 1 to 12,

Y represents OH, COOH or NH₂,
or wherein

R⁵ denotes a bivalent aromatic radical with 6 to 24C atoms, preferably with 6 to 16C atoms, the two valencies forming an angle of 45° to 180°. The bivalent aromatic radicals can be substituted by 1 to 4 $C_1$–$C_4$-alkyl, $C_1$–$C_4$-alkoxy, phenyl, phenoxy, benzyl or halogen radicals (preferably chlorine and bromine) and also include, in addition to phenylene, naphthylene and biphenylene, phenylene radicals bonded via oxygen, sulphur, carbonyl, sulphonyl, $C_1$–$C_4$-alkylene or -alkylidene, cyclohexylene or -hexylidene or —O(CH$_2$)$_n$O—, where n=1 to 4.

Preferred (cyclo)aliphatic aminocarboxylic acids are: aminoacetic acid, 3-amino-propanoic acid, 4-aminobutanoic acid, 6-amino-hexanoic acid, 1,1-aminoundecanoic acid and 4-aminocyclohexylcarboxylic acid, especially preferably 4-aminobutanoic acid, 6-aminohexanoic acid and 11-aminoundecanoic acid.

Preferred (cyclo)aliphatic diamines are ethylenediamine, 1,2-diaminopropane, 1,4-diaminobutane, 1,6-diaminohexane, 2,5-diamino-2,5-dimethylhexane, 1,4-diaminocyclohexane, 5-amino-1-aminomethyl-1,3,3-trisethylcyclohexane, 4,4'-methylenebiscyclohexylamine, bis-4-amino-3-methylcyclohexylmethane and bis-aminomethyl-hexahydro-4,7-indene, especially preferably 1,4-diaminobutane and 1,6-diaminohexane.

Preferred aminophenols are 3-aminophenol, 5-amino-2-chlorophenol, 4-aminophenol, 3-amino-2-methylphenol, 3-amino-4-methylphenol, 5-amino-1-naphthol, 6-amino-1-naphthol, 8-amino-2-naphthol, 6-amino-2-naphthol and 4-amino-1-hydroxy-biphenyl, especially preferably 3-aminophenol and 4-aminophenol.

Preferred aromatic aminocarboxylic acids are 2-aminobenzoic acid, 3-aminobenzoic acid, 4-aminobenzoic acid, 4-chloroanthranilic acid, 5-chloroanthranilic acid, 3-amino-4-chlorobenzoic acid, 4-amino-3-phenylbenzoic acid, 4-amino-3-methoxybenzoic acid, 4-amino-3-phenoxybenzoic acid, 6-amino-5-chloro-2-naphthoic acid, 6-amino-5-methyl-2-naphthoic acid and 6-amino-5-methoxy-2-naphthoic acid, more preferably 3-aminobenzoic acid, 4-aminobenzoic acid and 6-amino-2-naphthoic acid.

Preferred aromatic diamines are 1,2-diaminobenzene, 1,3-diaminobenzene, 1,4-diaminobenzene, 1,2-diamino-3-methylbenzene, 1,3-diamino-4-methylbenzene, 1,4-diamino-2-methylbenzene, 1,3-diamino-2-methylbenzene, 1,2-diamino-4-methylbenzene, 1,3-bisaminomethylbenzene, 1,4-diaminonaphthalene, 1,5-diaminonaphthalene, 1,8-diaminonaphthalene, 2,7-diaminonaphthalene, 4,4'-diaminobiphenyl, bis-(4-aminophenyl)-methane, 3-methylbenzidine, 2,2' dimethyl-(1,1'-biphenyl)-4,4'-diamine, 3,3'-dimethylbenzidine, 2,2-bis-(4-aminophenyl)-propane and 1,1-bis-(4-aminophenyl)-cyclohexane, especially preferably 1,4-diaminobenzene, 1,4-diamino-2-methylbenzene, 2,7-diaminonaphthalene, bis-(4 aminophenyl)-methane, 2,2-bis-(4-aminophenyl)-propane and 1,1-bis-(4-aminophenyl)-cyclohexane.

The abovementioned amino compounds can be employed either individually or as a mixture with one another.

Preferred oligomers of the formula (II) are those which contain on average 3 to 25, particularly preferably 4 to 20, aromatic part structures, an aromatic part structure being as defined under formula (I).

The abovementioned compounds of the formula (I) and (II) are in general employed in an amount of about 0.01 to 10 mol %, preferably 0.1 to 5 mol %, based on the sum of the number of mol of aromatic hydroxycarboxylic acids, if appropriate aromatic aminocarboxylic acids, diphenols and if appropriate aminophenols.

The abovementioned esters of the formula (I) can be prepared e.g. in accordance with the doctrine of German Patent Application P 3 824 365.2, that is to say by reaction of corresponding phenolic compounds or alkali metal salts thereof with corresponding reactive derivatives of aromatic carboxylic acids by known esterification processes.

The abovementioned compounds of the formula (II) are prepared by known melt transesterification processes, which are also used for the preparation of thermotropic LC polymers (direct esterification process [EP-A 01 02 719 and 134 204 and melt transesterification of phenyl carboxylates with diphenols (diphenyl ester process) [EP-A 072 540, 070 539, 024 499 and 45 499, DE-OS 20 25 971, EP 070 539and EP 01 32 637]).

The compounds of the formula (II) according to the invention are particularly preferably prepared by the acetate and/or by the diphenyl ester process.

In the preferred liquid crystal polycondensates which are built up from the abovementioned units a) to f), the content of aromatic hydroxycarboxylic acids is 40 to 85 mol %, preferably 50 to 80 mol %, the content of aromatic aminocarboxylic acid is 0 to 40 mol %, preferably 0 to 25 mol %, the content of diphenols is 60 to 15 mol %, preferably 50 to 20 mol %, and the content of amino-phenols is 0 to 95 mol %, preferably 0 to 20 mol %, based on the sum of the units a) to d).

The aromatic dicarboxylic acids and if appropriate the carbonic acid derivatives are employed in equimolar amounts to the diphenols and the aminophenols, that is to say to the extent of 60 to 15 mol %, preferably 50 to 20 mol %, it being possible for the content of carbonate groups in the polycondensate to be 0 to 40 mol %, preferably 0 to 30 mol %.

Possible aromatic hydroxycarboxylic acids a) are e.g. those compounds such as have been mentioned as formula (VII) and (VIII).

Preferred aromatic hydroxycarboxylic acids a) are e.g.: 4-hydroxy-3-methylbenzoic acid, 4-hydroxy-3-phenylbenzoic acid, 4-hydroxy-2-ethylbenzoic acid, 3-chloro-4-hydroxybenzoic acid, 3-bromo-4-hydroxybenzoic acid, 4-hydroxy-3-methoxybenzoic acid, 4-hydroxybenzoic acid, 6-hydroxynaphthoic acid, 4-hydroxy-3-phenoxybenzoic acid, 6-hydroxy-5-chloro-2-naphthoic acid, 6-hydroxy-5-methyl-2-naphthoic acid, 6-hydroxy-5-methoxy-2-naphthoic acid, 6-hydroxy-4,7-dichloro-2-naphthoic acid, 2-hydroxybenzoic acid, 3-hydroxy-4-methylbenzoic acid, 3-hydroxy-4-phenylbenzoic acid, 3-hydroxy-2-ethylbenzoic acid, 4-chloro-3-hydroxybenzoic acid, 4-bromo-3hydroxybenzoic acid, 3-hydroxy-4-methoxybenzoic acid, 3-hydroxy-4-phenoxybenzoic acid, 3-hydroxy-2-methoxybenzoic acid and 3-hydroxybenzoic acid, particularly preferably 4-hydroxybenzoic acid, 6-hydroxynaphthoic acid and 3-hydroxybenzoic acid.

Possible aromatic aminocarboxylic acids b) are e.g. compounds of the formulae

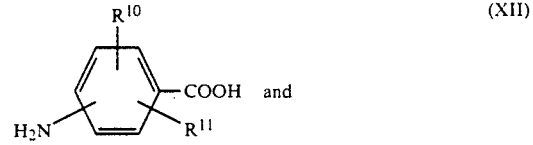 (XII)

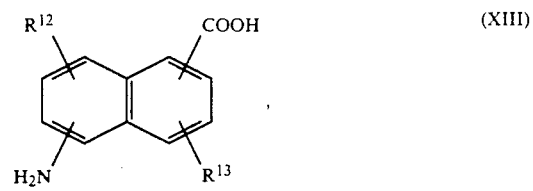 (XIII)

wherein $R^{10}$ to $R^{13}$ have the meaning of the radicals $R^6$ to $R^9$ of formulae (VII) and (VIII).

Preferred aromatic aminocarboxylic acids are 2-aminobenzoic acid, 3-aminobenzoic acid, 4-aminobenzoic acid, 4-chloroanthranilic acid, 5-chloroanthranilic acid, 3-amino-4-chlorobenzoic acid, 3-amino-4-methylbenzoic acid, 4-amino-3-methylbenzoic acid, 4-amino-3-phenylbenzoic acid, 3-bromo-4-aminobenzoic acid, 4-amino-3-methoxybenzoic acid, 6-amino-2-naphthoic acid, 4-amino-3-phenoxybenzoic acid, 6-amino-5-chloro-2-naphthoic acid, 6-amino-5-methyl-2-naphthoic acid, 6-amino-5-methoxy-2-naphthoic acid and 6-amino-4,7-dichloro-2-naphthoic acid, particularly preferably 4-aminobenzoic acid, 3-aminobenzoic acid and 6-amino-2-naphthoic acid.

Possible diphenols c) are those of the formula

HO—Z—OH (XIV)

wherein

Z has the meaning given in the case of formula (IX).

Preferred diphenols c) are e.g. hydroquinone, 4,4'-dihydroxydiphenyl, 4,4'-dihydroxydiphenyl ether, 4,4'-dihydroxydiphenylethane, 4,4'-dihydroxydiphenoxyethane, 3,5'-dihydroxydiphenyl, 3,5'-dihydroxydiphenyl ether, 1,5-dihydroxynaphthalene, 2,6-dihydroxynaphthalene, 1,4-dihydroxynaphthalene, chlorohydroquinone, bromohydroquinone, methylhydroquinone, phenylhydroquinone, ethylhydroquinone, 2,2'-dimethyl-4,4'-dihydroxydiphenyl, 3,3',5,5'-tetramethyl-4,4'-dihydroxydiphenyl, 3,5'-dimethoxy-4,4'-dihydroxydiphenyl ether, 1,2-(2-chloro-4-hydroxyphenoxy)-ethane, 4-methoxy-2,6-dihydroxynaphthalene, resorcinol, 3,4'-dihydroxydiphenyl, 3,4'-dihydroxydiphenyl ether, 3,4'-dihydroxydiphenoxyethane, 1,3-dihydroxynaphthalene, 1,6-dihydroxynaphthalene, 1,7-dihydroxynaphthalene, 2,7-dihydroxynaphthalene, 4-chlororesorcinol, 4-bromoresorcinol, 4-methylresorcinol, 4-phenylresorcinol, 4-ethoxyresorcinol, 2,5-dichloro-1,6-dihydroxynaphthalene and 4-methoxy-2,7-dihydroxynaphthalene, and hydroquinone and 4,4'-dihydroxydiphenyl are particularly preferred.

Possible aminophenols d) are those of the formula $$HO-Z-NH_2 \quad (XV)$$

wherein

Z has the meaning given in the case of formula (IX).

Preferred aminophenols are e.g.: 3-aminophenol, 5-amino-2-chlorophenol, 4-aminophenol, 3-amino-2-methylphenol, 3-amino-4-methylphenol, 5-amino-1-naphthol, 6-amino-1-naphthol, 5-amino-2-naphthol, 7-amino-2-naphthol, 8-amino-2-naphthol, 6-amino-2-naphthol and 4-amino-1-hydroxybiphenyl, and 3-aminophenol and 4-aminophenol are particularly preferred.

Possible aromatic dicarboxylic acids e) are those of the formula $$HOOC-A-COOH \quad (XVI)$$

wherein

A denotes a bivalent aromatic radical with 6 to 24C atoms, preferably with 6 to 16C atoms,
the two valencies forming an angle of 45° to 180°. The bivalent aromatic radicals can be substituted by 1 to 4 $C_1$-$C_4$-alkyl, $C_1$-$C_4$-alkoxy, phenyl, phenoxy, benzyl or halogen radicals (preferably chlorine and bromine) and also include, in addition to phenylene, naphthlyene and biphenylene, phenylene radicals bonded via oxygen, sulphur carbonyl, sulphonyl, $C_1$-$C_4$alkylene or -alkylidene, cyclohexylene or -hexylidene or —O(CH$_2$)$_n$O—, where n=1 to 4.

Preferred aromatic radicals (A) are e.g. 1,4-phenylene, 1,4-naphthylene or 4,4'-biphenylene, wherein the two bonds extend coaxially in opposite directions, or 1,5-naphthylene, 2,6-naphthylene or 3,5'-biphenylene, wherein the two bonds pointing in opposite directions are shifted parallel to one another, and 1,3-phenylene, 1,3-, 1,6-, 1,7- or 2,7-naphthylene or 3,4'-biphenylene, wherein the two bonds are not located on adjacent atoms and do not extend in opposite directions coaxially or with a parallel shift.

Preferred aromatic dicarboxylic acids are e.g. 1,4-naphthalenedicarboxylic acid, 1,5-naphthalenedicarboxylic acid, 2,6-naphthalenedicarboxylic acid, biphenyl-4,4'-dicarboxylic acid, biphenyl-3,3'-dicarboxylic acid, diphenoxyethane-4,4'-dicarboxylic acid, diphenyl ether-4,4'-dicarboxylic acid, methylterephthalic acid, methoxyterephthalic acid, chloroterephthalic acid, 4-chloronaphthalene-2,7-dicarboxylic acid, 1,3-naphthalenedicarboxylic acid, 1,6-naphthalenedicarboxylic acid, 1,7-naphthalenedicarboxylic acid, 2,7-naphthalenedicarboxylic acid, biphenyl-3,4'-dicarboxylic acid, diphenyl ether-3,4'-dicarboxylic acid, 4-methylisophthalic acid, 5-methylisophthalic acid, diphenyl ether-4,4'-dichloro-3,3'-dicarboxylic acid and iso- and terephthalic acid.

Particularly preferred aromatic dicarboxylic acids e) are iso- and terephthalic acid.

Derivatives which may be mentioned for incorporation of the carbonate groups f) are: diaryl carbonates, such as diphenyl carbonate, ditolyl carbonate, phenyl tolyl carbonate and dinaphthyl carbonate, dialkyl carbonates, such as diethyl carbonate, dimethyl carbonate, dimethyl dicarbonate and diethyl dicarbonate, as well as glycol carbonate.

A preferred derivative for incorporation of the carbonate groups f) is diphenyl carbonate.

The invention furthermore relates to a process for the preparation of liquid crystal polycondensates based on
a) aromatic hydroxycarboxylic acids,
b) if appropriate aromatic aminocarboxylic acids,
c) diphenols,
d) if appropriate aminophenols,
e) aromatic dicarboxylic acids and
f) if appropriate carbonic acid
which is characterized in that melt transesterification of $C_1$- to $C_4$-acyl esters derived from the hydroxycarboxylic acids, diphenols and aminophenols with the dicarboxylic acids or melt transesterification of the phenyl esters of the hydroxycarboxylic acids, if appropriate aminocarboxylic acids, dicarboxylic acids and carbonic acid with the diphenols and if appropriate aminophenols is carried out at 150° to 380° C. in the presence of aromatic esters of the formula (I) with a defined sequence of the structural units.

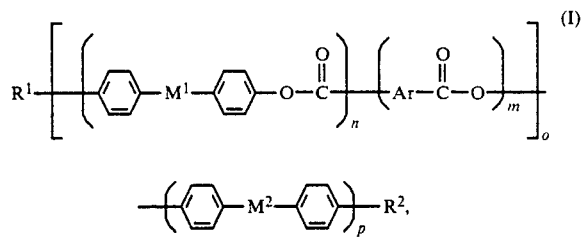

wherein

Ar is an aromatic radical which can be mononuclear or polynuclear it being possible for the polynuclear radical to be linked via a single bond or fused, $R^1$ and $R^2$ can be identical or different and are H, chlorine, O—$C_1$-$C_4$-alkyl, O—$C_3$-$C_6$-cycloalkyl, O—$C_6$-$C_{14}$-aryl, $C_1$-$C_4$-alkyl, $C_3$-$C_6$-cycloalkyl, $C_6$-$C_{14}$-aryl, fluorinated $C_1$-$C_4$-alkyl, fluorinated $C_3$-$C_6$-cycloalkyl, fluorinated $C_6$-$C_{14}$-aryl or a radical of the formulae (I)/a) to l):

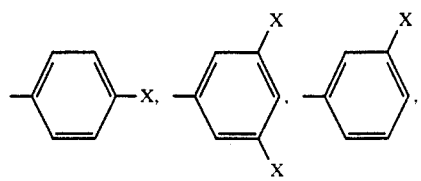

-continued

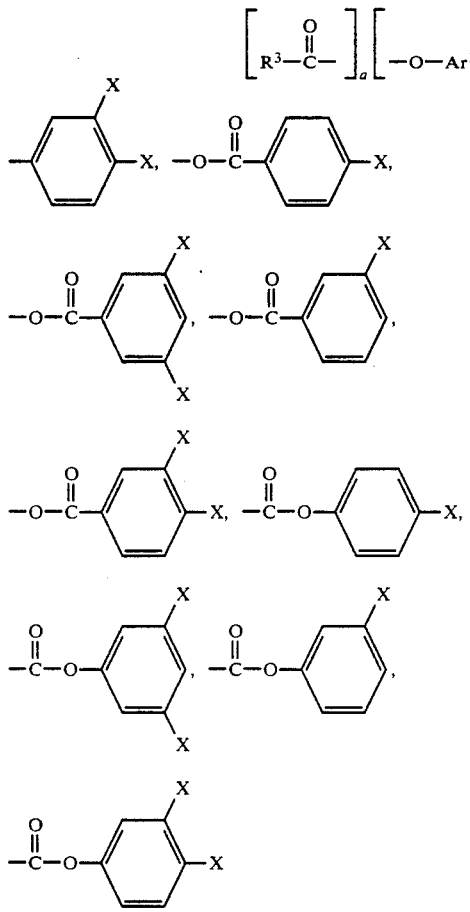

(radicals (I/a)–(I/l) corresponding to their linear (left ⟶ right) sequence), wherein
X represents the radicals mentioned above for $R^1$ or $R^2$ from H to fluorinated $C_6$–$C_{14}$-aryl,
$M^1$ and $M^2$ are identical or different and can be divalent radicals of the formulae (I.1) to (I.11):

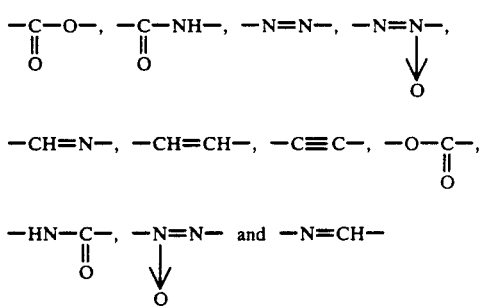

(I.1)–(I.11) [corresponding to their sequence]

and wherein
m is zero, 1 or 2,
n is 1 or 2,
o is 1, 2, or 3 and
p is zero or 1, and wherein, in the case where p=zero, $R^2$ can only be (Ia), (Ib), (Ic) or (Id),
or of oligomers of the formula (II) with random distribution of the structural units

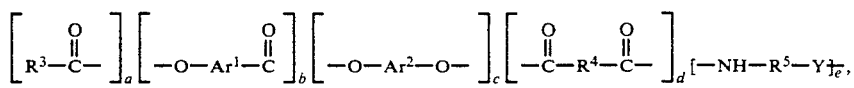

wherein
$R^3$ represents an alkyl or an optionally substituted aryl radical,
$Ar^1$ is a bivalent, optionally substituted mono- or polynuclear aromatic radical, it being possible for the polynuclear radical to be linked via a single bond or fused,
$Ar^2$ represents a bivalent, optionally substituted mono- or polynuclear aromatic radical, it being possible for the polynuclear radical to be linked in various ways,
$R^4$ and $R^5$ represent $C_mH_{2m}$, where m=0 to 50, or have the meaning of an optionally substituted bivalent mono- or polynuclear aromatic radical, it being possible for the polynuclear radical to be linked in various ways,
Y represents —O—, —CO— or —NH—, and in the case of linkage with an end group denotes —O— or —NH—,
a=2,
b=zero to 5,
c=1 to 5,
d=zero to 4 and
e=zero to 3,
and wherein the end groups are formed by structural elements of the type $R^3CO$.

The melt transesterification of the acyl esters derived from the hydroxycarboxylic acids and diphenols, preferably their acetates or diacetates, with the dicarboxylic acids and the splitting off of the carboxylic acid or acetic acid (acetate process) is described inter alia in EP 134 956 and 102 719. The melt transesterification of the reactive carboxyl derivatives, preferably the phenyl esters of the hydroxycarboxylic acids and dicarboxylic acids, with the diphenols and if appropriate diphenyl carbonate (diphenyl ester process) is described, for example, in EP 132 637 and 72 540.

The reactive derivatives, e.g. the acetates or diacetates, and the phenyl esters or diphenyl esters can be either prepared separately in a reaction step prior to the polycondensation or formed in situ in the reaction mixture in the presence of the other reaction components.

It is also advantageous to accelerate both the esterification or transesterification reactions and the polycondensation reactions catalytically. Such catalysts are, as is known, e.g. the oxides, hydrides, hydroxides, halides, alcoholates, phenolates, salts of inorganic or organic acids, complex salts or mixed salts of the alkali metals, e.g. lithium, sodium or potassium, the alkaline earth metals, e.g. magnesium or calcium the subgroup elements, e.g. vanadium, titanium, manganese, cobalt, nickel, zinc, lanthanum, cerium or zirconium, or elements thereof from other groups of the periodic table, e.g. germanium, tin, lead or antimony, or also the alkali metals or alkaline earth metals themselves, in particular sodium, sodium hydroxide, the acetates of lithium, sodium, potassium, calcium, magnesium, cobalt and zinc, calcium benzoate, magnesium acetylacetonate, zinc acetylacetonate, titanium tetrabutylate, titanium tetrapropylate, zirconium butylate, zirconium propylate, titanium tetraphenolate, sodium phenolate, germanium dioxide, antimony trioxide, dibutyl-tin diacetate, dibutyldimethoxy-tin, preferably alkyl-tin carboxylates, alkali metal carboxylates, such as K benzoate or K p-hydroxybenzoate, or imidazole. The amounts of catalyst are usually about 0.001 to 1, preferably 0.01 to 0.2 wt. %, based on the total weight of the monomers employed.

The liquid crystal polycondensates according to the inventions can be prepared at temperatures of about 150° to 380° C., the reaction in general being started at low temperatures and the temperature being increased continuously in the course of the reaction progressing. As the rate of reaction subsides, a vacuum can be applied, in which case the pressure is preferably reduced continuously from normal pressure to about 0.1 mbar.

In the preparation of the liquid crystal polycondensates according to the invention, the esters of the formulae (I) and (II) can be added at any point in time until a degree of splitting off of 95% of the volatile polycondensation product is achieved. The liquid crystal compounds are preferably added at the start when the monomer units are weighed out.

As the concentration of esters employed increases, the molecular weight and hence the melt and solution viscosity of the thermotropic polycondensates decrease. The thermotropic polycondensates according to the invention are distinguished, because of the blocked chain ends, by an increased heat stability and an excellent melt viscosity stability under processing conditions.

In the process according to the invention, the esters of the formula (I) and (II) are added in the amount described above.

With the chain stoppers or end masking agents described in the literature it has not been possible to obtain thermotropic polycondensates with a comparable degree of stability. This also applies to the use of the monomer units from which the esters to be employed have been synthesized.

The liquid crystal polycondensates according to the invention can easily be processed from the melt in the customary manner to give shaped articles, films, fibres and filaments.

EXAMPLES

Preparation of the esters of the formula (I) employed according to the invention Preparation of the liquid crystal polycondensates according to the invention in the presence of esters of the formula (I)

I. Preparation of the esters of the formula (I)

4-Hydroxyphenyl 4-hydroxybenzoate is prepared:

a) from 4-hydroxybenzoic acid by introduction of the carbobenzoxy group as a protective group and esterification with hydroquinone by the method of Schotten-Baumann and subsequent splitting off of the protective group.

Lit.: W. R. Krigbaum, Eur. Polym. J. 20, p. 225 (1984)

m.p.: 245°–246°C.

b) by direct esterification analogously to DE 3 622 611: 138.1 g 4-hydroxybenzoic acid and 110.1 g hydroquinone are suspended in 900 ml xylene together with 2 g boric acid and 2.5 g sulphuric acid and the suspension is heated under reflux until the splitting off of water has ended. The product is filtered off with suction, dried and washed with dilute Na bicarbonate solution, dried again and dissolved in 500 ml acetone. The undissolved material is filtered off hot and the product is precipitated from water, filtered off with suction and dried.

Yield: 182 g m.p.: 245°–247°C.

EXAMPLE 1

4-(4-Methylbenzoyloxy)-phenyl 4-(4-methylbenzoyloxy)-benzoate 345.3 g 4-hydroxyphenyl 4-hydroxybenzoate are suspended in 3,000 ml methylene chloride with 249 g pyridine, and 460 g methylbenzoyl chloride ar added at T=0° C. in the course of 3 h. The reaction mixture is subsequently stirred at room temperature for 14 h. The solvent is distilled off in vacuo and the residue is stirred up with 1.4 l 5% hydrochloric acid. The insoluble product is filtered off with suction, washed neutral with water and dried.

Yield: 643 g (85% of th.)

In the range from 190° to 350° C., a liquid crystal phase can be detected under a polarization microscope.

EXAMPLE 2

4-Benzoyloxyphenyl 4-benzoyloxybenzoate is prepared from 4-hydroxyphenyl 4-hydroxybenzoate and benzoyl chloride in accordance with the instructions from example 1.

Yield: 530 g (80% of th.)

In the range between 190° and 350° C., a liquid crystal phase was detected by means of polarization microscopy.

EXAMPLE3

4-(4-Methoxybenzoyloxy)-phenyl 4-(4 methoxybenzoyloxy)benzoate is prepared from 4-hydroxyphenyl 4-hydroxybenzoate and 4-methoxybenzoyl chloride in accordance with the instructions of example 1.

Yield: 420 g (84% of th.)

In the range between 180° and 330° C., the presence of a liquid crystal phase was detected by means of polarization microscopy.

Preparation of LC oligomers of the formula II by melt transesterification

EXAMPLE 4

276.0 g p-hydroxybenzoic acid
220.0 g hydroquinone
488.0 g benzoic acid
0.8 g magnesium and
624.2 g acetic anhydride were weighed into a reaction vessel with a stirrer, column and distillation bridge.

Splitting off of acetic acid started at an internal temperature of 160° C. As the rate of distillation subsided, the reaction temperature was increased slowly to 250° C.

When the distillation had ended, the pressure was lowered to 1 mbar in the course of 30 min. During the vacuum phase, residual amounts of acetic acid were split off in the course of 2 h.

The product was introduced into a tin can and after cooling was comminuted.

Yield: 876 g

In the range between 190° and 350° C., a liquid crystal phase was detected by means of polarization microscopy.

EXAMPLE 5

Analogously to the instructions in example 4
193.2 g p-hydroxybenzoic acid
260.4 g 4,4'-dihydroxydiphenyl
341.6 g benzoic acid
0.07 g magnesium and
437.0 g acetic anhydride are weighed out and reacted.
In the range from 180° to 320° C., a liquid crystal phase was detected by means of polarization microscopy.

EXAMPLE 6

Analogously to the instructions in example 4
207.0 g p-hydroxybenzoic acid
165.0 g hydroquinone
166.0 g isophthalic-acid
122.0 g benzoic acid
0.06 g magnesium and
468.0 g acetic anhydride are weighed out and reacted.
Yield: 560 g In the range from 220° to 320° C. a liquid crystal phase was found by means of polarization microscopy.

II. Preparation of the LC polycondensates

EXAMPLE 7

Polyester-carbonate 328.73 g p-hydroxybenzoic acid
107.91 g hydroquinone
26.07 g 4,4'-dihydroxydiphenyl
17.44 g terephthalic acid
772.26 g diphenyl carbonate
0.1 g magnesium oxide various amounts of the chain stoppers as mentioned in tables 1 and 2 were weiGhed into a reaction vessel with a stirrer, column and distillation bridge.

Splitting off of $CO_2$ started at an internal temperature of 160° C. The internal temperature was increased to 180° C. in the course of 15 min, kept constant for 60 min, increased to 220° C. and kept constant until the splitting off of $CO_2$ had ended.

The reaction mixture was heated up to 250° C. and the pressure in the reactor gas reduced stepwise to 30 mbar. After 1 h, the rate of distillation had subsided to the extent that the internal temperature could be increased to 275° C. and then 300° C. When the splitting off of phenol had largely ended, the pressure in the reactor was reduced to 0.2 mbar. After 1 h under these condensation conditions, the reaction had ended.

Product description: highly viscous, very marked fibrous structure
Product colour: beige The LC polyester-carbonates prepared in the presence of various chain stoppers (end masking agents) are summarized in Tables 1 and 2.

The comparisons with other monofunctional compounds and with phenyl benzoate clearly show the good efficiency of the chain stoppers according to the invention.

TABLE 1

| (Chain stoppers of the formula I) | | | |
|---|---|---|---|
| Ester from example no. | Conc. mol % | η rel[1] | TGA[2] % |
| — | — | 3.38 | 1.8 |
| 1 | 0.2 | 3.15 | 1.1 |
| 1 | 0.4 | 2.96 | 0.9 |
| 1 | 1.0 | 2.19 | 0.9 |
| 1 | 2.0 | 1.58 | 0.7 |
| 2 | 0.2 | 3.21 | 0.8 |
| 2 | 0.4 | 2.99 | 0.6 |
| 2 | 1.0 | 2.23 | 0.5 |
| 2 | 2.0 | 1.63 | 0.5 |
| Comparison examples: | | | |
| 4-hydroxy-biphenyl | 0.2 | 3.28 | 2.3 |
| | 0.4 | 2.95 | 3.0 |
| | 1.0 | 3.15 | 1.9 |
| | 2.0 | 3.07 | 2.6 |
| biphenyl carboxylic acid | 0.2 | 3.31 | 3.1 |
| | 0.4 | 3.07 | 2.8 |
| | 1.0 | 3.14 | 2.5 |
| | 2.0 | 3.08 | 3.4 |
| phenyl benzoate | 0.2 | 3.28 | 3.5 |
| | 0.4 | 3.18 | 2.8 |
| | 1.0 | 3.19 | 3.1 |
| | 2.0 | 3.25 | 3.0 |

[1] Measured in p-chlorophenol, 60° C., 0.5 g/dl solution viscosity
[2] Thermogravimetric analysis/1 h at 350° C., $N_2$

TABLE 2

| (Chain stoppers of the formula II) | | | |
|---|---|---|---|
| Ester from example no. | Conc. mol % | η rel[1] | TGA[2] % |
| 4 | 0.5 | 2.77 | 0.8 |
| 4 | 1.0 | 2.11 | 0.5 |
| 4 | 2.0 | 1.57 | 0.4 |
| 5 | 0.5 | 2.81 | 0.7 |
| 5 | 1.0 | 2.25 | 0.4 |
| 5 | 2.0 | 1.65 | 0.4 |

[1] Measured in p-chlorophenol, 60° C., 0.5 g/dl solution viscosity
[2] Thermogravimetric analysis/1 h at 350° C., $N_2$

EXAMPLE 8

Polyester 287.29 g p-hydroxybenzoic acid
105.71 g hydroquinone
29.79 g 4,4-dihydroxydiphenyl
2.58 g terephthalic acid
186.07 g isophthalic acid
449.85 g acetic anhydride as well as
0.1 g magnesium acetate (anhydrous) and
0.15 g antimony trioxide various amounts of chain stoppers as mentioned in Tables 3 and 4 were weighed into a 1 l vessel with a ground glass joint and a ground glass lid, stirrer, nitrogen inlet and distillation attachment connected to a condenser.

The mixture was heated to 170° C. by means of a salt bath under a nitrogen atmosphere. As soon as the distillation of acetic acid subsided (after about 45 min) the temperature in the reaction vessel was increased to 250° C. in the course of one hour and to 330° C. in the course of a further hour. When (he distillation had ended, the pressure was lowered to about 1 mbar in the course of 30 min. During the vacuum phase the viscosity of the polymer melt increased markedly. The melt was therefore stirred more slowly. At the end of this phase, the total amount of acetic acid (contains residual acetic anhydride) had been collected.

Product description; pale beige, highly viscous, marked fibrous structure.

The LC polyesters prepared in the pressure of various chain stoppers (end masking agents) are summarized in Tables 3 and 4.

TABLE 3

| | (Chain stopper of the formula I) | | |
|---|---|---|---|
| Ester from example | Conc. mol % | $\eta$ rel[1] | TGA[2] % |
| — | — | 2.87 | 1.1 |
| 1 | 0.2 | 2.78 | 0.8 |
| 1 | 0.4 | 2.58 | 0.7 |
| 1 | 1.0 | 2.24 | 0.7 |
| 1 | 2.0 | 1.30 | 0.6 |
| 2 | 0.2 | 2.79 | 0.7 |
| 2 | 0.4 | 2.61 | 0.7 |
| 2 | 1.0 | 2.28 | 0.6 |
| 2 | 2.0 | 1.35 | 0.7 |
| Comparison examples | | | |
| 4-hydroxy-biphenyl | 0.2 | 2.81 | 1.2 |
| | 0.4 | 2.79 | 1.3 |
| | 1.0 | 2.75 | 1.2 |
| | 2.0 | 2.78 | 1.5 |
| biphenyl-carboxylic acid | 0.2 | 2.80 | 1.2 |
| | 0.4 | 2.81 | 1.4 |
| | 1.0 | 2.76 | 1.4 |
| | 2.0 | 2.75 | 1.4 |
| phenyl benzoate | 0.2 | 2.83 | 1.3 |
| | 0.4 | 2.82 | 1.7 |
| | 1.0 | 2.78 | 1.9 |
| | 2.0 | 2.81 | 2.1 |

[1] p-Chlorophenol, 60° C., 0.5 g/dl
[2] 1 h at 350° C., $N_2$

TABLE 4

| | (Chain stoppers of the formula II) | | |
|---|---|---|---|
| Ester from example | Conc. mol % | $\eta$ rel[1] | TGA[2] % |
| 4 | 0.5 | 2.50 | 0.7 |
| 4 | 1.0 | 2.20 | 0.5 |
| 4 | 2.0 | 1.38 | 0.3 |
| 5 | 0.5 | 2.47 | 0.75 |
| 5 | 1.0 | 2.15 | 0.5 |
| 5 | 2.0 | 1.34 | 0.4 |
| 6 | 0.5 | 2.58 | 0.6 |
| 6 | 1.0 | 2.29 | 0.5 |
| 6 | 2.0 | 1.46 | 0.3 |

[1] p-Chlorophenol, 60° C., 0.5 g/dl
[2] 1 h at 350° C., $N_2$

Comparable good results in respect of solution viscosity (molecular weight regulation) and heat stability (TGA) are also achieved with the other compounds of the formulae I and II according to the invention.

The improved viscosity stability of the liquid crystal polycondensates according to the invention can be demonstrated by a long-term tempering experiment.

For this, a liquid crystal polyester from example 8 is prepared 1. in the presence o& biphenyl-4-carboxylic acid and 2. in the presence of additive 4 (0.5 mol) (example 4) and tempered at 320° C. in the melt and the melt viscosity is determined as a function of time.

The flow curves of the two products after a standing time of 4 h at 320° C. are shown in FIG. 1.

A comparison of the two products clearly shows the superior viscosity stability of the LC polymer prepared in the presence of compound II in comparison with the product containing a monofunctional chain stopper such as biphenyl-4-carboxylic acid.

FIG. 1: Melt viscosity of polycondensates, measured after a standing time of 4 h at 320° C.

Preparation a) with 0.5 mol % biphenyl-4-carboxylic acid

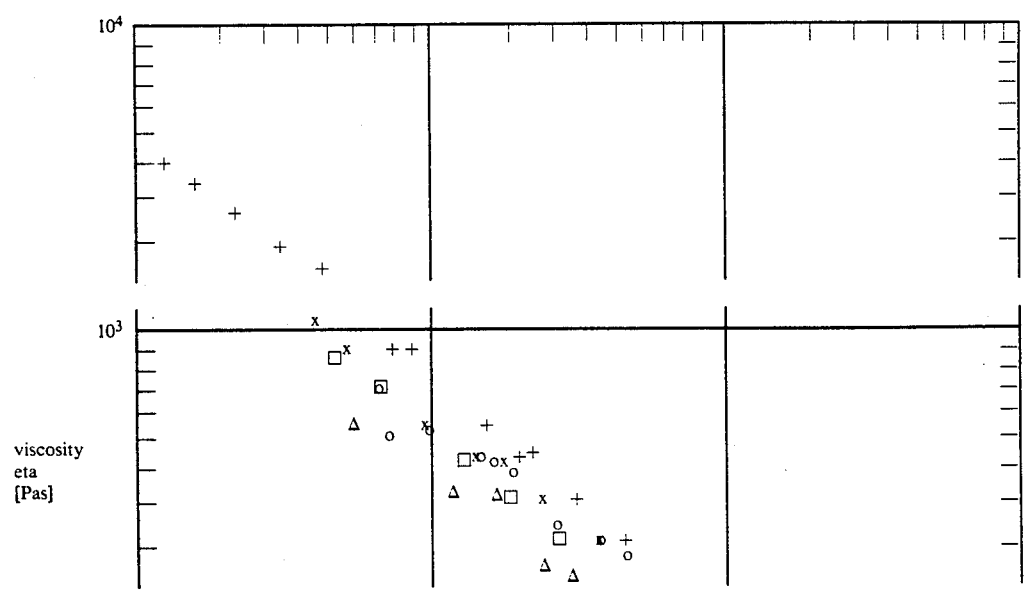

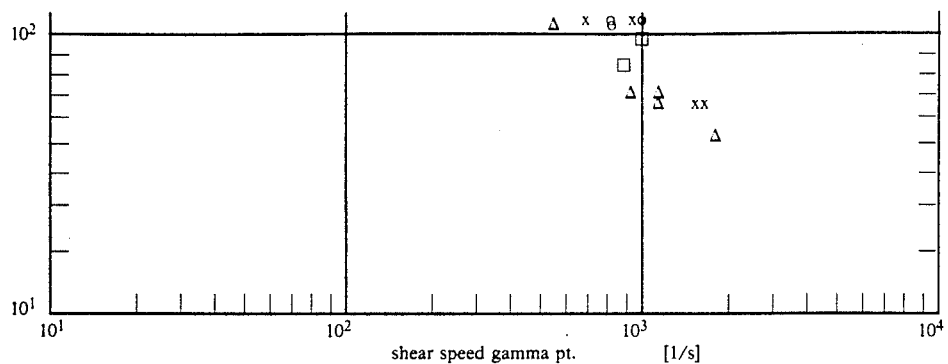

+ 1st measurement
o 2nd measurement
x 3rd measurement
Δ 4th measurement
□ 5th measurement b) with 0.5 mol % compound of the formula II from example 4

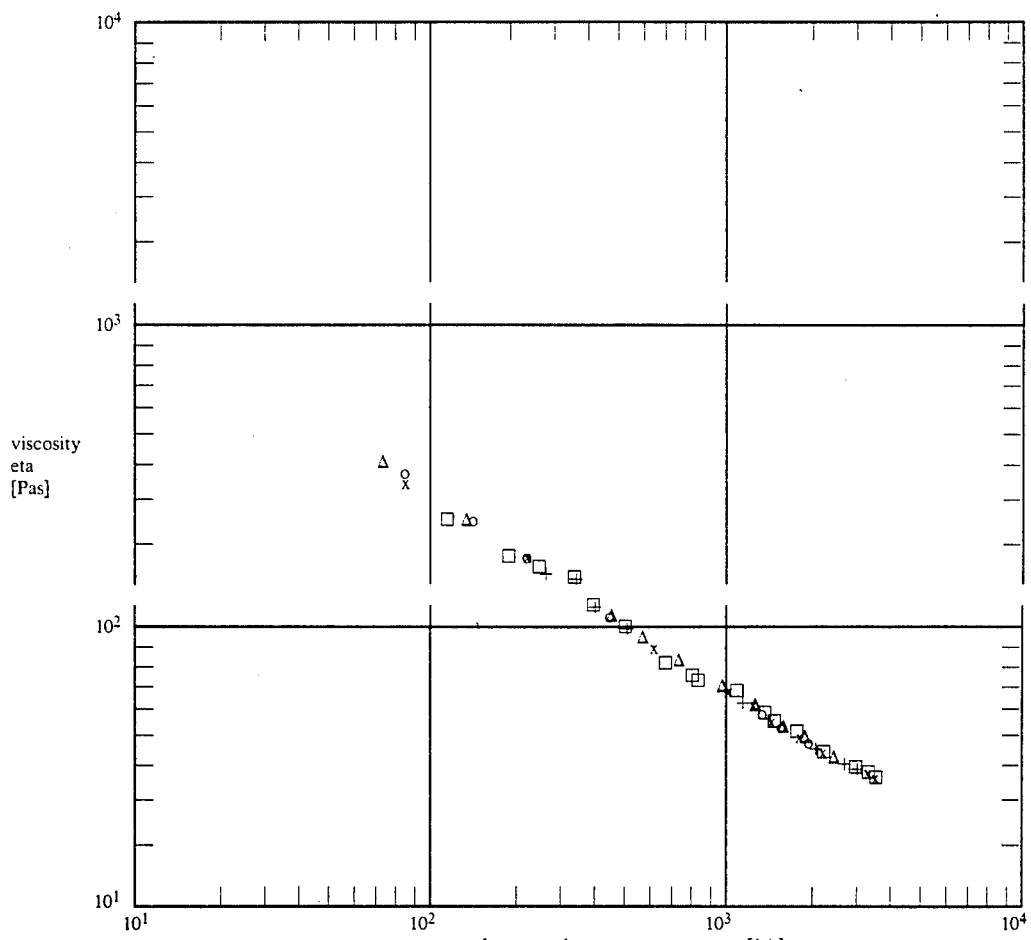

+ 1st measurement
o 2nd measurement
x 3rd measurement
Δ 4th measurement
□ 5th measurement

We claim:
1. Liquid crystal polycondensate comprising co-condensed aromatic hydroxycarboxylic acid, with or without aromatic aminocarboxylic acids, diphenol, with or without aminophenol, and aromatic dicarboxylic acid, with or without carbonic acid, obtainable by melt transesterification of $C_1$- to $C_4$-acyl ester derived from said hydroxycarboxylic acid, diphenol and aminophenol with dicarboxylic acid or by melt transesterification of phenyl ester of said hydroxycarboxylic acid, with or without aminocarboxylic acid, dicarboxylic acid and carbonic acid with diphenol with or without aminophenol at 150° to 380° C. in the presence of 0.1 to 10 mol % of aromatic ester of the following formula (I) or oligomers of the following formula (II):

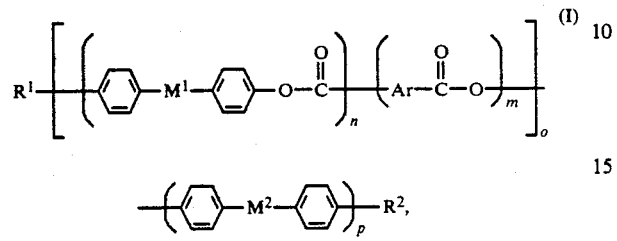

wherein
Ar is an aromatic radical which is mononuclear or polynuclear,
$R^1$ and $R^2$ are identical or different and each is H, chlorine, —O—$C_1$-$C_4$- alkyl, —O—$C_3$-$C_6$-cycloalkyl, O—$C_6$-$C_{14}$-aryl, $C_1$-alkyl, $C_3$-$C_6$-cycloalkyl, $C_6$-$C_{14}$-aryl, fluorinated $C_1$-alkyl, fluorinated $C_3$-$C_6$-cycloalkyl, fluorinated $C_6$-$C_{14}$-aryl or a radical of the formulae

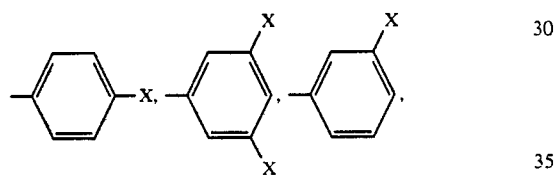

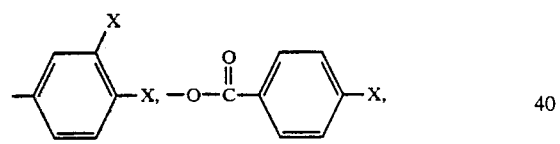

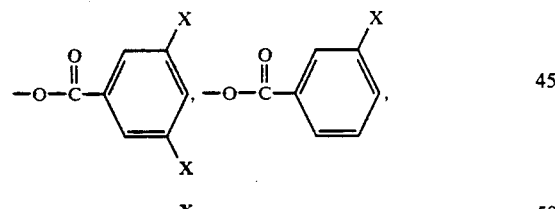

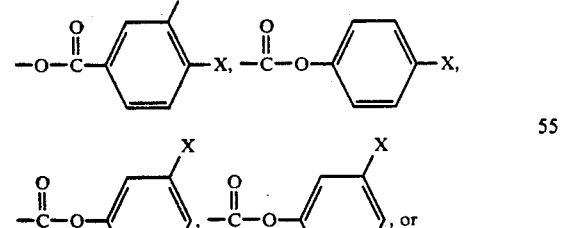

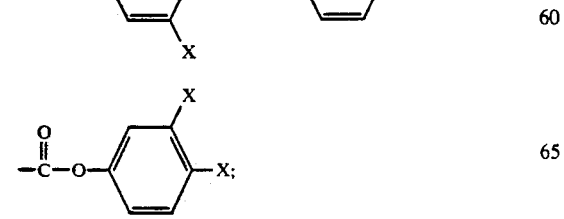

wherein
X represents H, chlorine, —O—$C_1$-$C_4$-alkyl, —O—$C_3$-$C_6$-cycloalkyl, —O—$C_6$-$C_{14}$-aryl, $C_1$-$C_4$-alkyl, $C_3$-$C_6$-cycloalkyl, $C_6$-$C_{14}$-aryl or fluorinated $C_1$1-$C_4$-alkyl;
$M^1$ and $M^2$ are identical or different and each is a divalent radical of the formulae

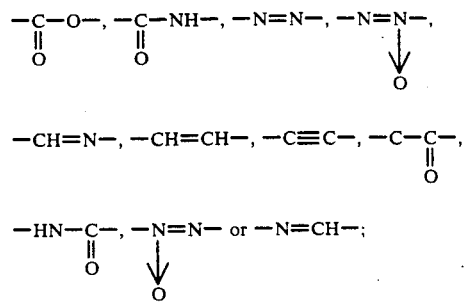

and wherein
m is zero, 1 or 2,
n is 1 or 2,
o is 1, 2 or 3 and
p is zero or 1, with the proviso that when p is zero, $R^2$ is

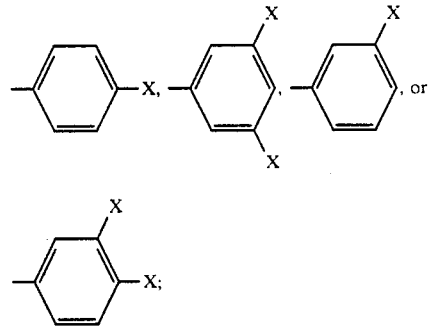

and wherein
oligomers of the formula (II) are a random distribution of the structural units

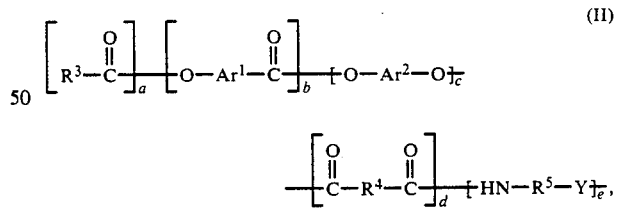

wherein
$R^3$ represents alkyl or aryl radical;
$Ar^1$ is a bivalent, mono-or polynuclear aromatic radical;
$Ar^2$ represents a bivalent, mono- or polynuclear aromatic radical;
$R^4$ and $R^5$ represent $C_mH_{2m}$, where m is 0 to 50, or a bivalent mono-or polynuclear aromatic radical;
Y represents —O—, —CO— or —NH—, with the proviso that Y is —O— or —NH— when bonded to an end group;
a is 2,
b is zero to 5, c is 1 to 5,
d is zero to 4,
e is zero to 3,
and wherein the end groups are $R^3CO$.

2. Process for the preparation of liquid crystal polycondensates comprising polycondensed aromatic hydroxycarboxylic acids, diphenols, and aromatic dicarboxylic acids which process comprises melt transesterifying $C_1$- to $C_4$-acyl esters obtained from said hydroxycarboxylic acids and diphenols with the dicarboxylic acids or melt transesterifying phenyl esters of the hydroxycarboxylic acids and dicarboxylic acids with the diphenols at 150° to 380° C. in the presence of aromatic esters of the formula (I) or oligomers of the formula (II):

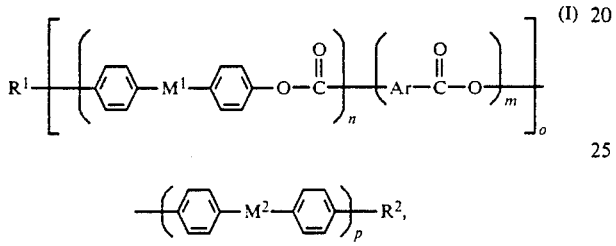

wherein
Ar is an aromatic radical which is mononuclear or polynuclear,
$R^1$ and $R^2$ are identical or different and each is H, chlorine, $-O-C_1-C_4$-alkyl, $-O-C_3-C_6$-cycloalkyl, $O-C_6-C_{14}$-aryl, $C_1-C_4$-alkyl, $C_3-C_6$-cycloalkyl, $C_6-C_{14}$ aryl, fluorinated $C_1-C_4$-alkyl, fluorinated $C_3-C_6$-cycloalkyl, fluorinated $C_6-C_{14}$-aryl or a radical of the formulae

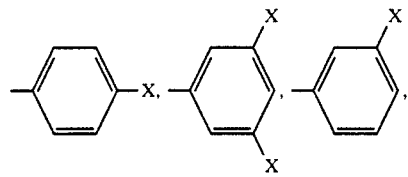

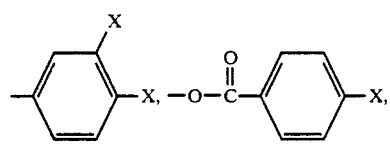

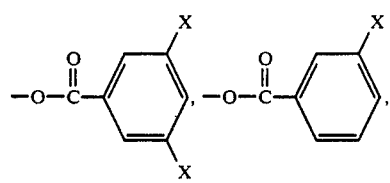

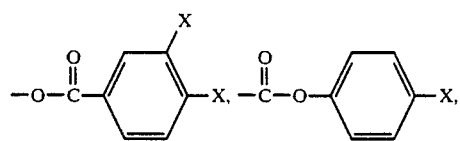

wherein
X represents H, chlorine, $-O-C_1-C_4$-alkyl, $-O-C_3-C_6$-cycloalkyl, $-O-C_6-C_{14}$-aryl, $C_1-C_4$-alkyl, $C_3-C_6$-cycloalkyl, $C_6-C_{14}$-aryl or fluorinated $C_1-C_4$-alkyl;
$M^1$ and $M^2$ are identical or different and each is a divalent radical of the formulae

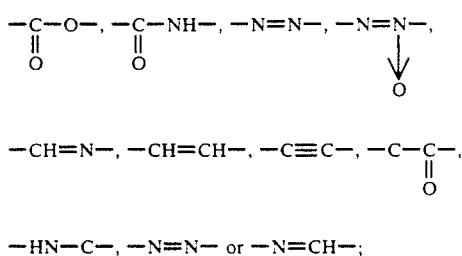

and wherein
m is zero, 1 or 2,
n is 1 or 2,
o is 1, 2 or 3 and
p is zero or 1, with the proviso that when p is zero, $R^2$ is

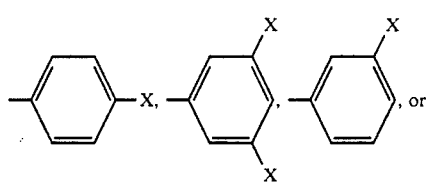

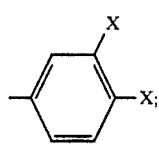

and wherein
oligomers of the formula (II) are a random distribution of the structural units

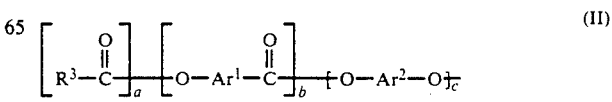

-continued

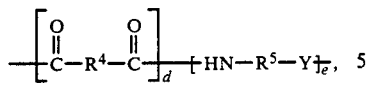

wherein

R³ represents alkyl or aryl radical;

Ar¹ is a bivalent, mono-or polynuclear aromatic radical;

Ar² represents a bivalent, mono- or polynuclear aromatic radical;

R⁴ and R⁵ represent $C_mH_{2m}$, where m is 0 to 50, or a bivalent mono-or polynuclear aromatic radical;

Y represents —O—, —CO— or —NH—, with the proviso that Y is —O— or —NH— when bonded to an end group;

a is 2,
b is zero to 5,
c is 1 to 5,
d is zero to 4,
e is zero to 3,
and wherein the end groups are R³CO.

3. Process according to claim 2, characterized in that the esters of the formulae (I) or (II) are employed in an amount of 0.01 to 10 mol %, based on the sum of the number of mol of aromatic acids, and phenols.

4. Use of the liquid crystal polycondensates according to claim 1 for the production of shaped articles, films, fibres and filaments.

* * * * *